(12) United States Patent
Sarnoff et al.

(10) Patent No.: US 8,678,223 B2
(45) Date of Patent: Mar. 25, 2014

(54) PAN WITH HANDLES

(75) Inventors: Norton Sarnoff, Northbrook, IL (US); Raj Patel, Zurich, IL (US)

(73) Assignee: Handi-Foil Corporation, Wheeling, IL (US)

( * ) Notice: Subject to any disclaimer, the term of this patent is extended or adjusted under 35 U.S.C. 154(b) by 0 days.

(21) Appl. No.: 13/450,601

(22) Filed: Apr. 19, 2012

(65) Prior Publication Data
US 2013/0277264 A1 Oct. 24, 2013

(51) Int. Cl.
*B65D 6/08* (2006.01)
*B65D 21/02* (2006.01)
*A47J 36/34* (2006.01)

(52) U.S. Cl.
USPC ..... 220/491; 220/743; 220/23.91; 220/573.4; 220/761; 220/766; 220/772; 220/647; 220/769; 206/449; 206/515

(58) Field of Classification Search
USPC ........... 220/23.91, 573.4, 743, 761, 766, 772, 220/647, 912, 573.1, 573.3, 769, 763, 765, 220/752, 485–495; 206/499, 515
See application file for complete search history.

(56) References Cited

U.S. PATENT DOCUMENTS

| | | | | |
|---|---|---|---|---|
| 1,219,969 A | * | 3/1917 | Lowe | 220/756 |
| 3,279,641 A | * | 10/1966 | Fredrick | 220/494 |
| 4,717,038 A | * | 1/1988 | Anders | 220/769 |
| 4,852,760 A | * | 8/1989 | Sarnoff et al. | 220/743 |
| 4,971,216 A | * | 11/1990 | Fortune | 220/756 |
| 5,029,721 A | * | 7/1991 | Timpe | 220/769 |
| D333,235 S | | 2/1993 | Bertelsen | |
| 5,339,728 A | * | 8/1994 | Marchwiak et al. | 99/426 |
| 6,065,629 A | | 5/2000 | Sarnoff et al. | |
| 6,213,005 B1 | * | 4/2001 | Sherman et al. | 99/426 |

* cited by examiner

*Primary Examiner* — Anthony Stashick
*Assistant Examiner* — Jennifer Castriotta
(74) *Attorney, Agent, or Firm* — Adam K. Sacharoff

(57) ABSTRACT

An assembly having a pan and a formed wire rack for receiving and supporting the pan. the rack includes a pair of handles freely and rotatably attached to a closed rim-rack section of the wire rack. Each handle includes a lateral portion and a pair of arms having first arm ends attached to the lateral portion, and the pair of arms having second arm ends separately terminating to a flat section, distal ends of the flat sections being rotatably secured about the closed rim-rack section, and wherein the flat sections include loops freely rotatably secured about the closed rim-rack section.

3 Claims, 4 Drawing Sheets

PAN WITH HANDLES

BACKGROUND OF THE INVENTION

Aluminum foil pans are widely used for cooking, baking and roasting since they are very efficient in quickly distributing heat and are also inexpensive, thus making them disposable. A wide variety of shapes and sizes of aluminum foil pans have been developed for use with food items to be cooked or baked or roasted in an oven. Generally, such pans have upper rims which add rigidity and strength to the pans. Also, stamped formations are typically provided in the bottom wall and creases are formed in the sidewall of the pan for additional reinforcement. To provide still further strength and stability, especially when foil pans are used for baking or roasting heavier items, such as turkeys, hams, roasts, etc., holders or racks for supporting disposable aluminum foil pans are now fairly widely used in association with the pans.

Frequently such holders and racks are permanently combined with a pan for one-time use and disposal. Such assemblies are available in the marketplace and typical such assemblies are illustrated in patents such as U.S. Pat. Nos. 6,065,629; 4,852,760; 4,029,721; and D-333,235. In the latter case the disposable pan is removably secured to the rack.

It would be desirable to provide an improved rack and pan assembly which is readily adaptable to marketing and shipping as a combined rack, pan and cover assembly, and which facilitates usage of the rack by incorporating the ability to be easily nested with another similarly designed rack and pan assembly.

SUMMARY OF THE INVENTION

The summary is defined by providing an assembly of a pan and wire rack. The pan includes a well defined by a bottom wall and a continuous upstanding sidewall extending from an edge of the bottom wall. The upstanding sidewall terminates at an outwardly formed rim. The formed wire rack receives and supports the pan. The rack is defined by a pair of parallel wire members. Each wire member has an elongated wire form section terminating at opposite ends in first upwardly extending portions The first upwardly extending portions further turn toward each other and are joined to form a closed rim-rack section defined to be underneath and support the rim of the pan. A second elongated wire form member transverses the pair of parallel wire members. The second elongated wire form member terminating at opposite ends in second upwardly extending portions, and the second upwardly extending portions further include rim engaging members. A pair of handles freely are rotatably attached to the closed rim-rack section.

The handles include a lateral portion and a pair of arms having first arm ends attached to the lateral portion. The pair of arms have second arm ends separately terminating to a flat section, while distal ends of the flat sections are rotatably secured about the closed rim-rack section. The flat sections include loops freely rotatably secured about the closed rim-rack section.

The assembly may also include a bead about the rim and the rim engaging members include an inwardly opening gripper portion fitted about the bead. And may include lateral portions with a predetermined distance to separate the arms from each other.

The benefit of the present invention is that in a resting position, the handle is defined to be positioned against the pan such that the assembly may nest inside the well of a second assembly similarly defined.

Further objects, features and advantages of the present invention will become apparent from the following description and drawings.

DETAILED DESCRIPTION

Figure 1:
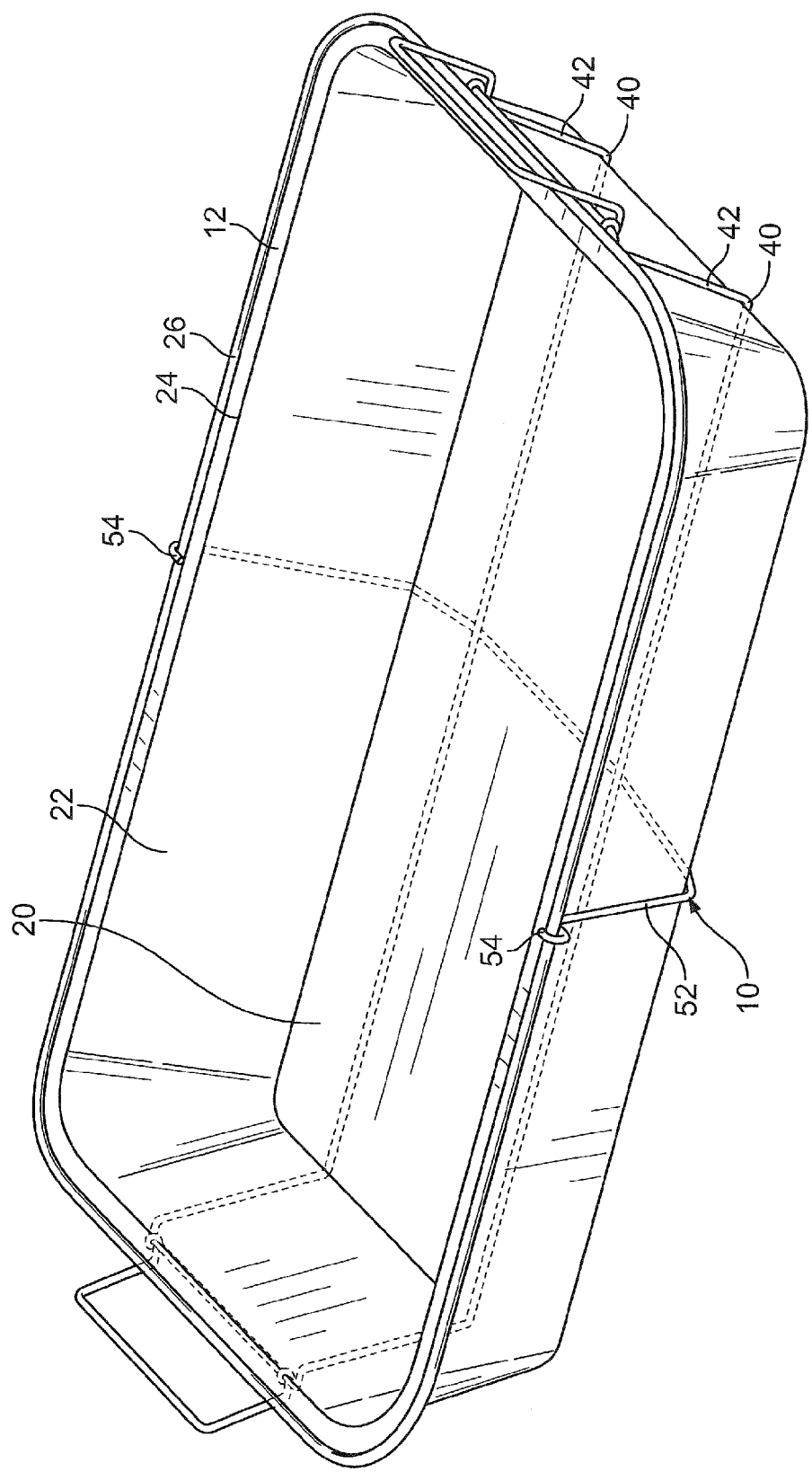
FIG. 1 is a perspective view of a first embodiment of an assembly of a formed wire rack and associated pan of the present invention.
Figure 2:
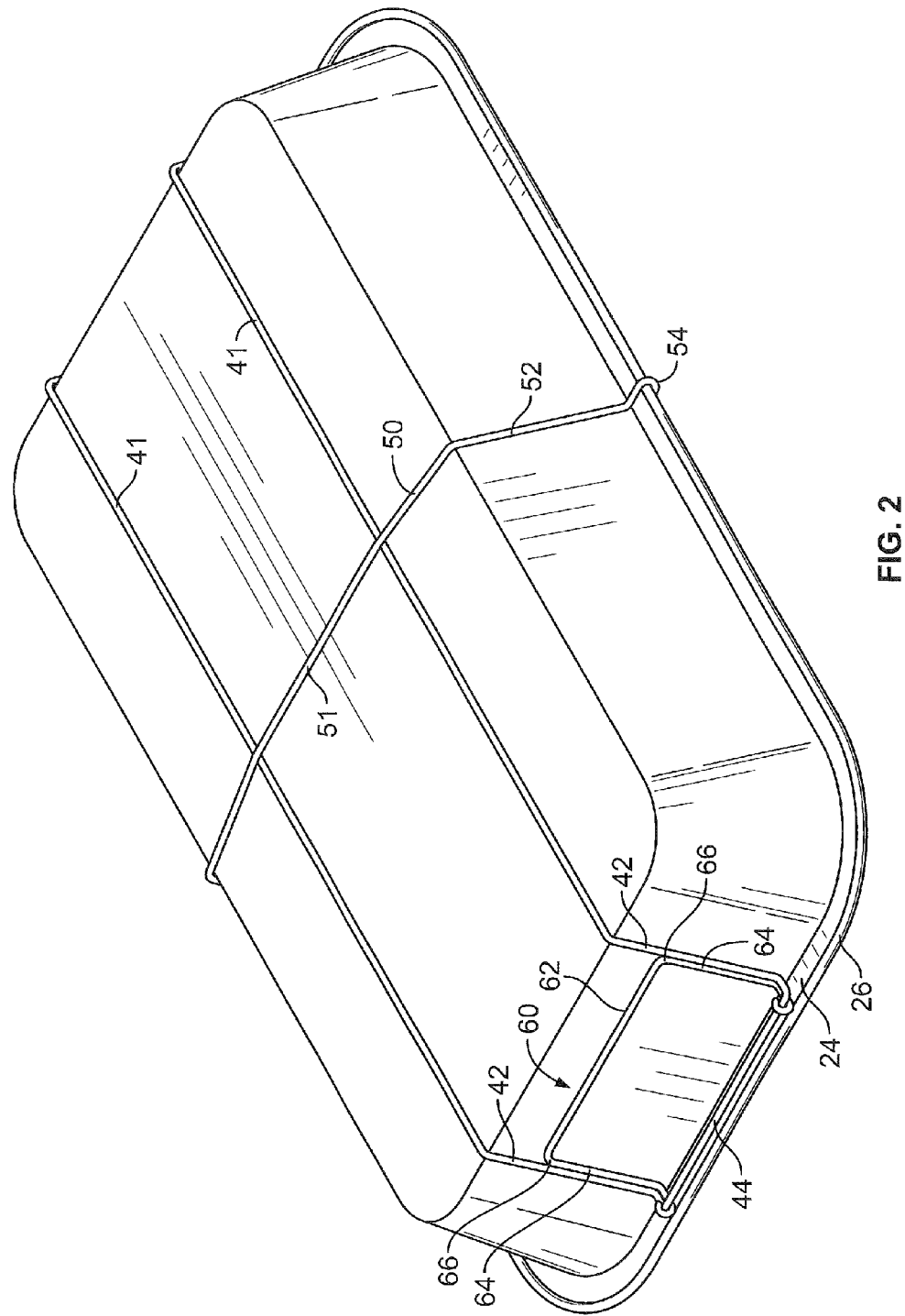
FIG. 2 is a bottom view of the assembly of FIG. 1.
Figure 3:
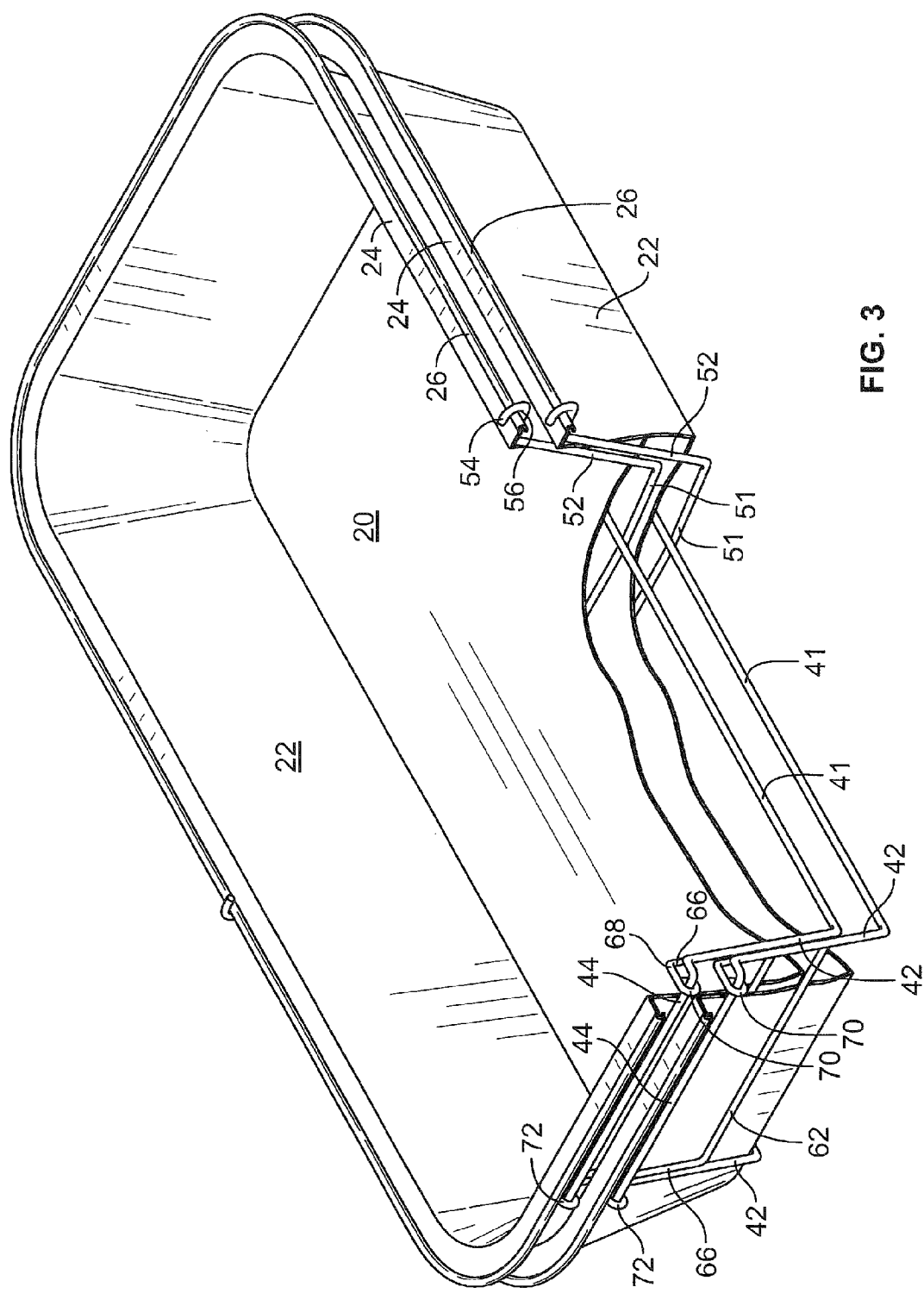
FIG. 3 is a top perspective view of nesting pans of FIG. 1.
Figure 4:
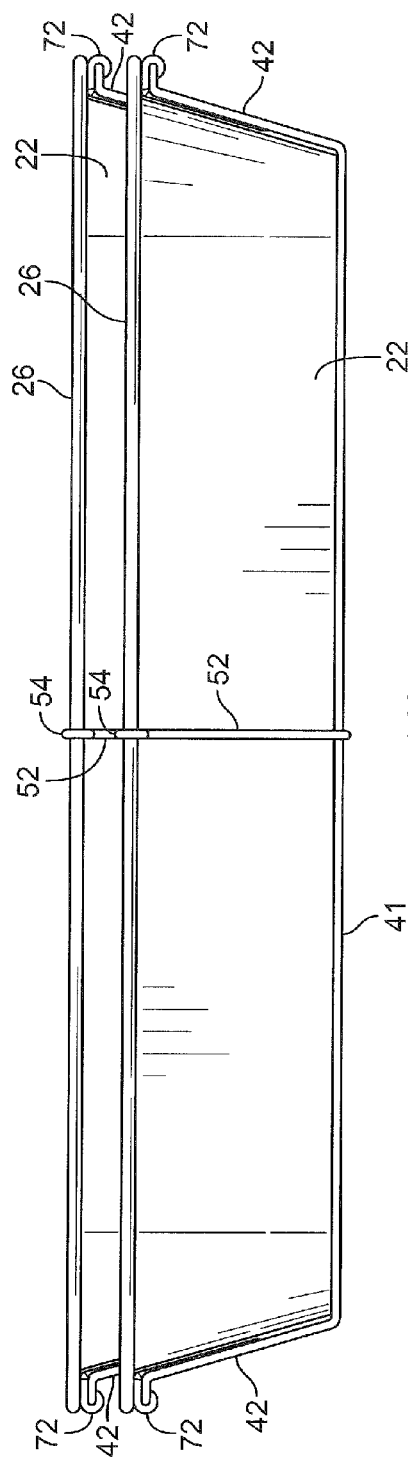
FIG. 4 is a side view of nesting pans.

Referring now to the drawings, FIG. 1 illustrates an assembled array of a wire form rack 10 of the present invention and a thin gauge stamped and formed aluminum foil pan. The pan 12 generally comprises a bottom wall or base 20, a continuous upstanding sidewall 22 and a rim 24. Rim 24 terminates outwardly in a rolled-over lip or peripheral bead 26 defining the border of the pan 12.

Referring now to the wire form rack 10, it is seen to serve as a frame for receiving a pan 12 and for stably supporting a pan 12, such as when it is introduced into and removed from an oven. The rack 10 includes a pair of parallel wire members 40, each comprising an elongated wire form section 41 which terminates at opposite ends in upwardly extending portions 42. The extending portion 42 turn toward each other are joined therewith to form a closed rim-rack section 44 which closely underlines and supports the rim 24 of the pan 12.

The wire members 40 may be continuous and brazed or welded to form a unitary assemblage or may comprise a pair of generally similar members which are U-shaped in plan view and which are brazed or welded at points of overlap to form a unitary handle assembly which extends across the width of an associated pan.

The rack 10 further comprises a second elongated wire form member 50 which is transverse to the first wire form member 40. Wire form member 50 extends lengthwise of the rack 10 and is brazed or welded to wire form member 40 to form an integrated assembly. Wire form member 50 may comprise a wire form section 51. Wire form section 51 terminates at opposite ends in upwardly extending portions 52. Portions 52, at each end of the wire form member 50, provide a lip or bead gripping formation 54.

As will be appreciated, the wire form sections 41, 51 lie in a substantially common plane and serve to provide a support for the base 20 of a pan in use. The upwardly extending portions 42, 52 of the wire form members nestingly receive and support the sidewall 22 of a pan in use. The closed rim-rack sections 44 underlie the rim 24 of the pan 12 and serve to help support pans in use.

In accordance with the present invention, the bead gripping formations 54 comprise an inwardly opening gripper portion 56 which, in the embodiment illustrated, comprises, at each end of the member 51.

Attached to each closed sectional portion 44 are freely rotatable handles. The handles 60 are substantially closed shaped, defined by having lateral portion 62 and a pair of arms 64. The pair of arms 64 are attached to the lateral portion 62 at first arm ends 66. The lateral portion having a predetermined distance to keep the arms apart from each other, such that a user's hand or some or all of a person's fingers can fit and grasp the lateral portion. The pair of arms have a second end 68 that terminates to a flat section 70. The distal end of the flat section 70 rotatably attached to the closed sectional portion 44. The rotatable attachment at the distal end of the flat section 70 is accomplished by having a loop 72 around the closed sectional portion. The flat section 70 permits the handle to more closely nest against the pan when not in use, meaning the flat section 70 will nest closely against the rim 24 while the arms nest closely against the side wall 22.

Figure 7:
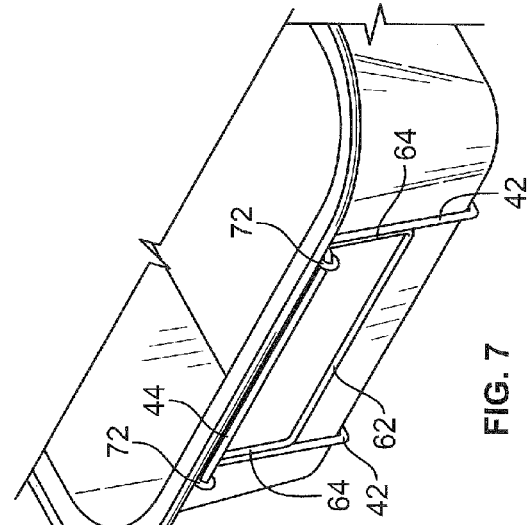
FIG. 7 is a partial perspective view of the handle in a downward position.
Figure 6:
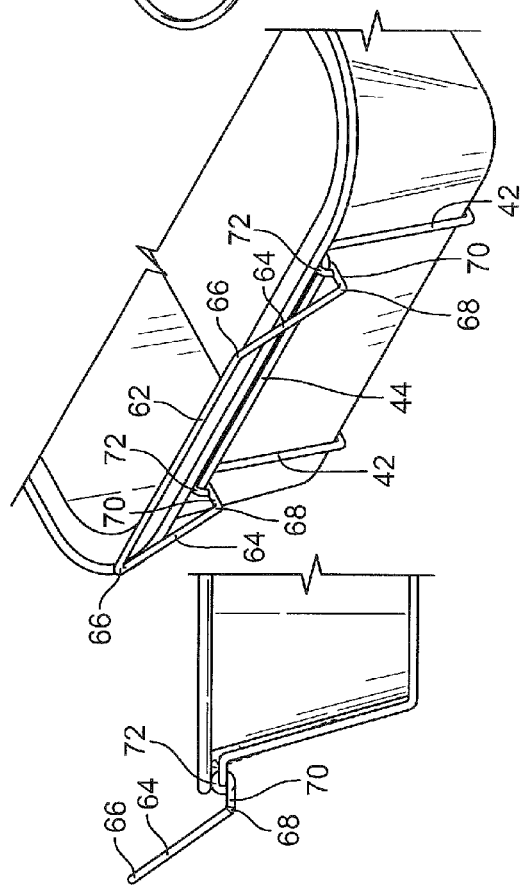
FIG. 6 is a partial perspective view of FIG. 5.
Figure 5:
FIG. 5 is a partial side view of the handle in an upward position.

The greatest advantage of the present invention is that the close nesting of the handles permits multiple pans similarly designed to be capable of nesting within each other without the handles preventing the stacking or becoming an obstacle for stacking or nesting. The rotatably handles also permit the handles to rotate out when needed by the user as shown in FIGS. 5-7.

It will be apparent to those skilled in the art that changes and modifications may be made in the foregoing without departing from the spirit of the invention, the scope of which is defined by the appended claims.

What is claimed is:

1. An assembly comprising:
a pan having a well defined by a bottom wall and a continuous upstanding sidewall extending from an edge of the bottom wall, the upstanding sidewall terminating at an outwardly formed rim;
a formed wire rack for receiving and supporting the pan, the rack includes:
  a pair of parallel wire members, each wire member having an elongated wire form section terminating at opposite ends in first upwardly extending portions, the first upwardly extending portions further turn toward each other and are joined to form a closed rim-rack section defined to be underneath and support the rim of the pan; and
  a second elongated wire form member transverse to the pair of parallel wire members, the second elongated wire form member terminating at opposite ends in second upwardly extending portions, the second upwardly extending portions further include rim engaging member; and
a pair of handles freely rotatably attached to the closed rim-rack section, and each handle having a lateral portion, and a pair of arms having first arm ends attached to the lateral portion, and the pair of arms having second arm ends separately terminating to a flat section, each flat section terminates to a loop freely rotatably secured about the closed rim-rack section, and wherein the handles have an upright position defined by having the pair of arms extending away from the pan such that the lateral portion is configured to a position above the outwardly formed rim of the pan and the handles rotatable to a resting position defined against the continuous upstanding sidewall of the pan such that the flat sections of each handle is structurally configured to extend along an underside portion of the outwardly formed rim to cause the lateral portion which extends from the flat section at an angle to rest substantially against the continuous upstanding sidewall of the pan, wherein when in the resting position portions of the pan, portions of the wire rack, and portions of the pair of handles nest inside a well of a second assembly similarly defined without having the handles obstruct the assembly being nested.

2. The assembly of claim 1, wherein the pan further includes a bead about the rim and the rim engaging member includes an inwardly opening gripper portion fitted about the bead.

3. The assembly of claim 1, wherein the lateral portion has a predetermined distance configured to separate the arms from each other and further configured to cause the arms to rest on an inside portion of the first and second upwardly extending portions.

* * * * *